United States Patent [19]

Thomas et al.

[11] Patent Number: 4,966,394
[45] Date of Patent: Oct. 30, 1990

[54] AUTOMOTIVE PASSIVE COMFORT SEAT BELT SYSTEM

[75] Inventors: Rudy V. Thomas, Sterling Hgts.; Kenneth S. Towers, Royal Oak, both of Mich.

[73] Assignee: Allied-Signal Inc., Morris Township, Morris County, N.J.

[21] Appl. No.: 401,217

[22] Filed: Aug. 31, 1989

[51] Int. Cl.[5] .............................................. B60R 21/10
[52] U.S. Cl. ................................................... 280/807
[58] Field of Search ........................ 280/801, 802, 807

[56] References Cited

U.S. PATENT DOCUMENTS

| 4,655,312 | 4/1987 | Frantom et al. | 280/807 |
| 4,659,108 | 4/1987 | Sack et al. | 280/807 |
| 4,669,751 | 6/1987 | Unger | 280/807 |
| 4,721,269 | 1/1988 | Gulette et al. | 280/807 |

Primary Examiner—Kenneth R. Rice

[57] ABSTRACT

A safety restraint system (10) for a vehicle comprising: a safety belt (20) having a seat belt portion connected to a buckle (64) and a shoulder belt portion connected to a motorized retractor which includes a reversible motor (34). The shoulder belt portion is received through a D-ring (60) having associated therewith a first angle sensor (80). The system additionally includes a logic control unit (104) which controls the system through various modes of operation. In its normal mode of operation the logic control unit monitors and stores the value of the D-ring (60) angle and initiates the rewind of the seat belt (20) during instances of excess shoulder belt slack. Upon rewinding the shoulder belt the motor (34) is commanded to reverse wind to pay-out a very small amount of the seat belt webbing thereby relieving shoulder belt tension.

23 Claims, 6 Drawing Sheets

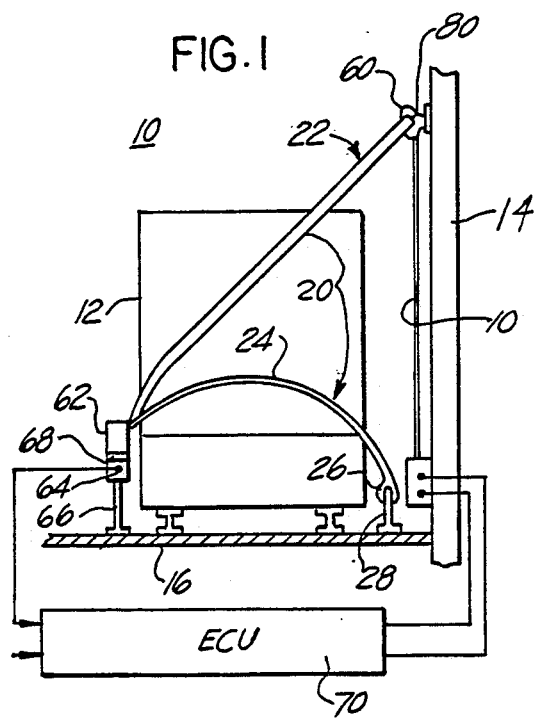
FIG. 1
FIG. 3
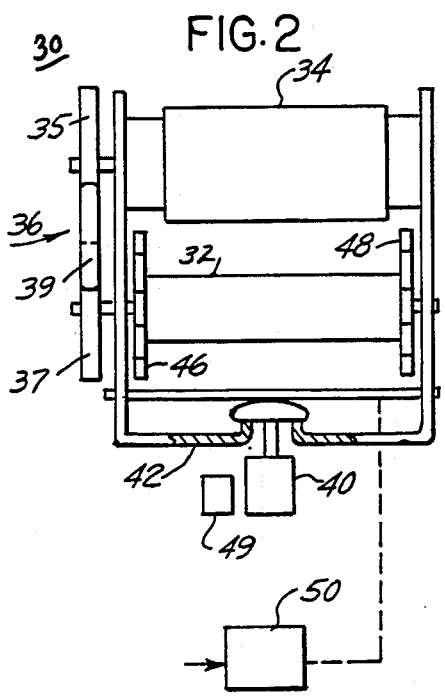
FIG. 2

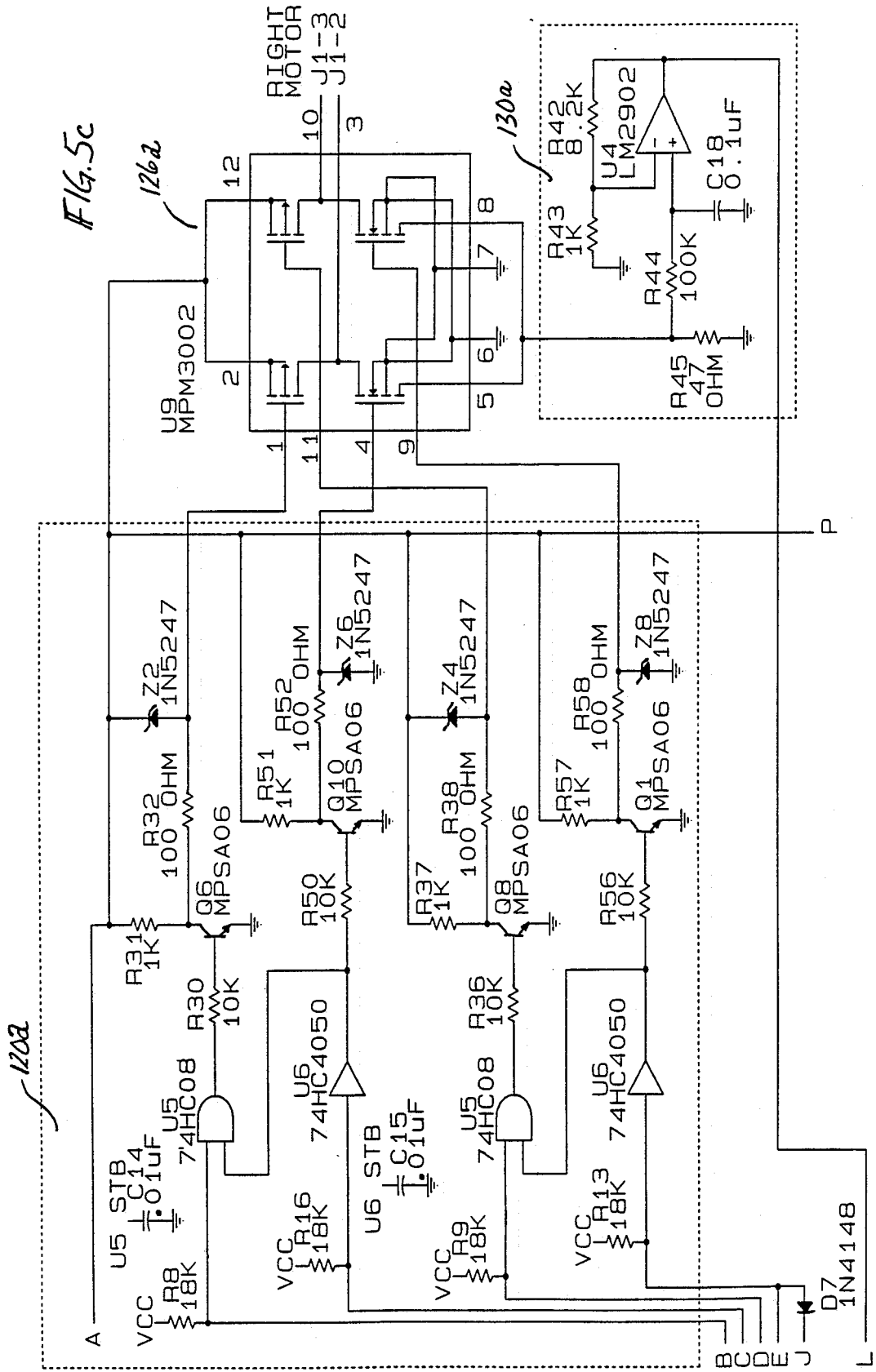

AUTOMOTIVE PASSIVE COMFORT SEAT BELT SYSTEM

BACKGROUND AND SUMMARY OF THE INVENTION

The invention is generally related to automotive safety restraint systems and in particular to a restraint system having a seat belt retractor driven by a reversible electric motor for securing, in a comfortable manner, a safety belt about a vehicle occupant. Current three-point safety restraint systems employ a spring biased retractor that may or may not use mechanical tension eliminators.

As is often the case, these devices maintain a constant, sometimes objectionable pressure on the occupant's shoulder. The result of this uncomfortable pressure may cause the occupant not to use the safety restraint system at all or to adjust the shoulder belt portion in a manner that creates an unsafe situation. As an example the occupant may cause the tension eliminator to engage at a position leaving a greater than optimal slack in the shoulder belt.

Commonly owned U.S. Pat. No. 4,655,311 illustrates a motor-driven seat belt system designed to eliminate excess slack in the safety belt so as to properly restrain an occupant of the vehicle during a crash. The present invention improves upon the teachings of this patent and while retaining the concept of properly protecting the occupant during a crash further enhances occupant comfort.

It is an object of the present invention to provide an electrically operable seat belt system responsive to the relative motion of the D-ring to control the tension in the safety belt. A further object of the present invention is to automatically stow the safety belt during intervals of non-use. Another object of the present invention is to properly adjust the safety belt about the occupant for maximum protection. Another object of the present invention is to lock the safety belt during a crash by physically inhibiting the rotation of the motor and thereby preventing extension of the safety belt.

Accordingly, the present invention comprises: a safety restraint system for a vehicle comprising: a safety belt attachable at one portion thereof to a buckle means. The buckle means comprising a tongue portion attached to a safety belt, and a buckle portion for receiving the tongue. A first sensor means, is provided, for generating a first signal indicative of a buckled and an unbuckled state. The system includes D-ring means adapted to be rotatably mounted to a vehicle member, for slideably receiving a shoulder belt portion of the safety belt, and second sensor means, coacting with the D-ring means for generating a second signal indicative of D-ring motion; and retractor means adapted to be secured to a structure member of the vehicle, including a take-up spool, attached to an end of the shoulder belt and a reversible electric motor, in driving engagement with the take-up spool for rotating same in rewind and reverse directions in response to rewind and reverse control signals. The system additionally includes third means for generating a third signal indicative of motor torque; and control logic means for generating the rewind and reverse control in response to the states of the first and second sensor means including first storage means, responsive to the second signal, for storing a value indicative of D-ring position. The system will automatically enter various modes of operation to stow the safety belt upon occupant exit from the vehicle and to automatically tighten the safety belt about the occupant in a controlled manner to insure occupant safety belt comfort. To control occupant comfort, the belt after being pulled taut about the occupant, is released a small amount to reduce belt tension on the occupant's shoulder to a nominal amount. The above is accomplished by monitoring D-ring position and provides safety belt tension control when the occupant moves to new temporary and/or permanent seating positions. The system also includes a crash mode which monitors the output of a sensor, that responds to vehicle deceleration. Upon sensing a high deceleration level the retractor motor is commanded to immediately rewind to eliminate all safety belt slack. A retractor lock solenoid is also provided to physically lock the retractor to prevent the paying out of the safety belt during high decleration conditions.

BRIEF DESCRIPTIONS OF THE DRAWINGS

In the drawings

FIG. 1 is a diagramatic view of a safety restraint system.

FIG. 2 illustrates a cross sectional view of a retractor useable within the present invention.

FIG. 3 illustrates a D-ring and associated position sensor.

Figure 4:
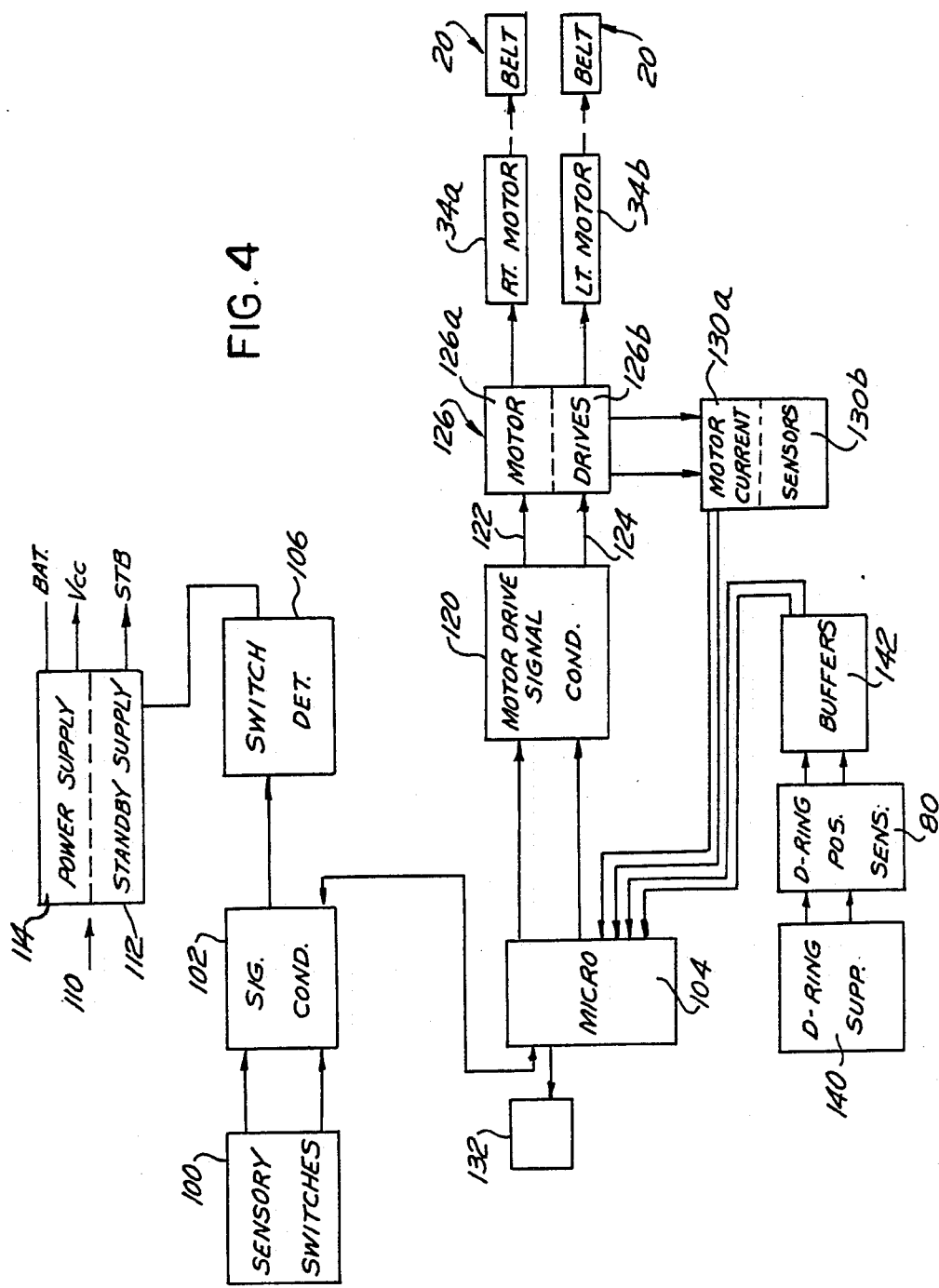
FIG. 4 is a block diagram indicating the major components of a control system used in the present invention.
Figure 5A:
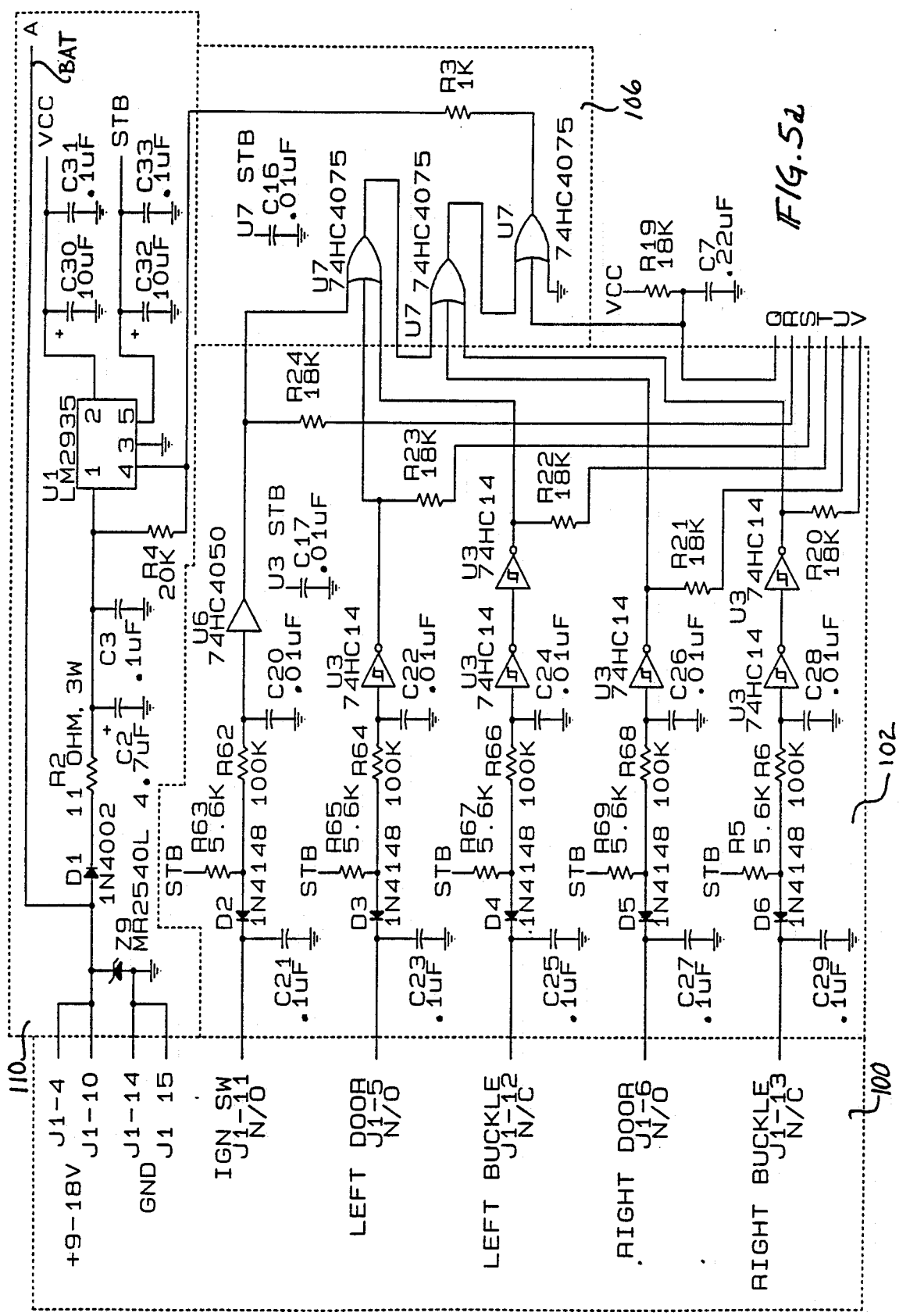
Figure 5B:
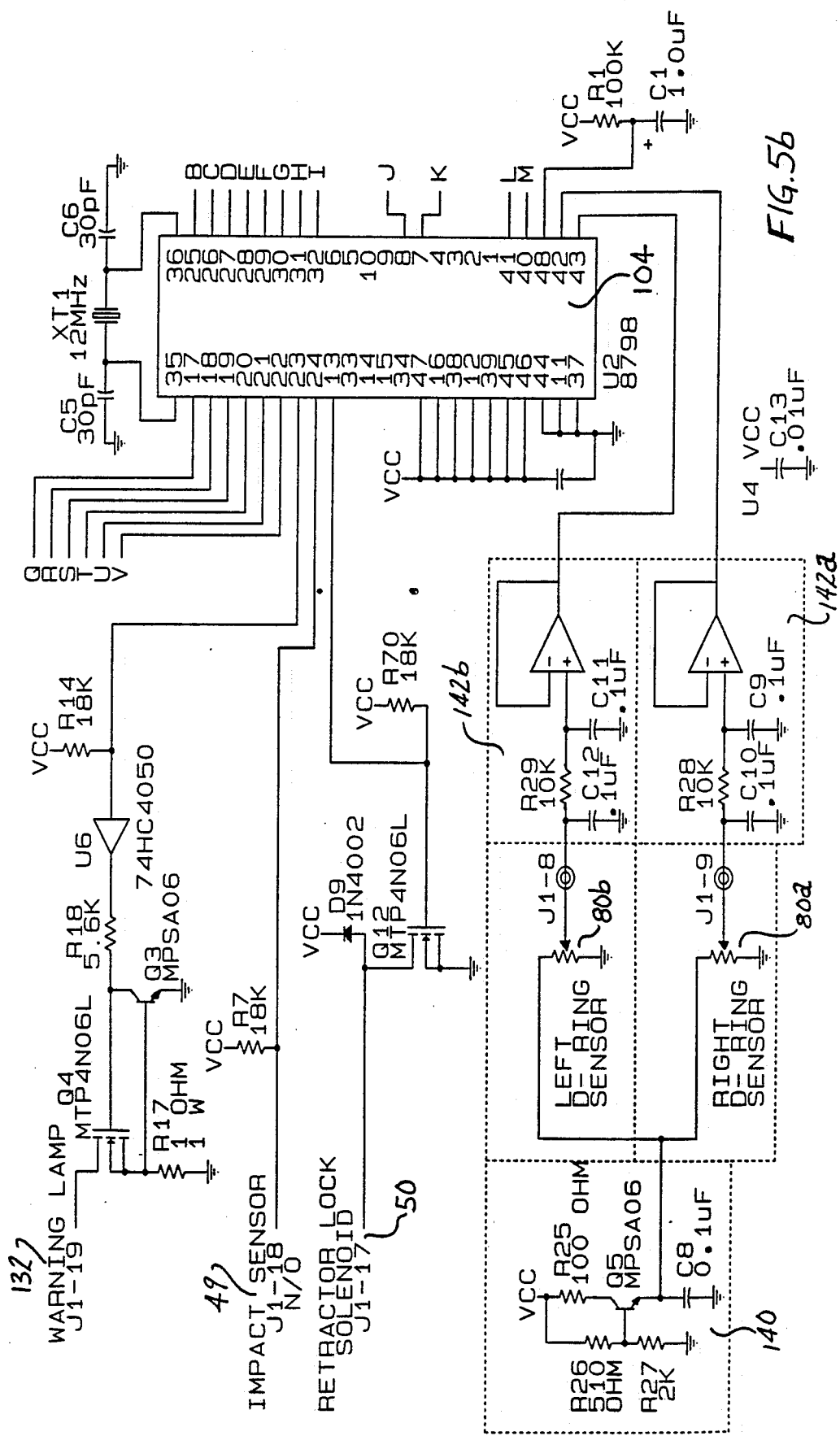

FIGS. 5a and 5b shown in left and right hand positions a and b, is a more detailed depiction of the control system of FIG. 4.

DETAILED DESCRIPTION OF THE DRAWINGS

FIG. 1 illustrates many of the components of a continuous loop three-point electrically adjustable safety restraint system 10. Also illustrated in FIG. 1 is a seat 12 positioned adjacent a side or B pillar 14. The seat 12 is attached to the vehicle floor 16 in a conventional manner. The safety belt 20 having a shoulder belt portion 22 and a seat belt portion 24 is shown in an occupant-restraining condition wherein one end 26 of the safety belt 20 is attached to the vehicle via an anchor bracket 28. The other end of the safety belt is connected to a motor-driven safety belt retractor attached to the pillar 14. The particular point of attachment of the retractor 30 to the vehicle may vary with the specific application of the system 10. It should be noted that configurations of seat belts other than the continuous loop, three-point belt, described herein, are useable with the present invention.

With reference to FIG. 2 there is shown a typical embodiment of the retractor 30. More specifically the retractor 30 comprises a take-up spool 32 which may be driven by a motor 34 through a gear train 36. The use of a pulley belt permits a quieter operation than is normally achieved with a gear train. The pulleys 35 and 37 and belt 39 connects the output shaft of the motor to the shaft of the take-up spool 32. The retractor 30 may include an inertial sensor 40 (typically a pendulum or lock dog) of conventional design which will lock up the take-up spool 32 in the event of a crash to prevent the crash forces from pulling out the seat belt. Typically, such inertial sensors are pivotably attached to the retractor frame 42 in a manner such that the inertial forces during a crash will displace a pall bar 44 into engagement with teeth of ratchet wheels 46 and 48 to lock same. A switch or sensor 49 is provided proximate the inertial sensor 40 to sense pendulum or lock dog motion. The retractor 30 may also include a retractor lock solenoid 50 which upon activation may move the pall bar or other member into contact with the ratchet wheels 46 and 48. As can be seen, the retractor 30 is configured in a manner so as not to require a tension eliminator associated with many prior three-point seat belt systems.

Returning to FIG. 1 it can be seen that the safety belt 20 extends from the motor-driven retractor 30 through a web guide such as D-ring 60. The safety belt 20 is slideably received through the D-ring as more particularly illustrated in FIG. 3. The web guide or D-ring 16 is attached to the pillar 14 at approximately shoulder height. The shoulder belt portion 22 and seat belt portion 24 are joined at an adjustable tongue 62 which is received within a buckle 64. It should be appreciated that the safety belt 20 may include one or both of the seat belts or shoulder belt portions. The buckle 64 is attached to the vehicle floor through a support 66 in a conventional manner. The buckle 64 may include an electrical switch 68 which generates a signal signifying that the occupant has latched the tongue 62 within the buckle 64 and as such is indicative of the fact that the occupant has engaged the restraint system 10. FIG. 1 also diagramatically illustrates an electronic control unit (ECU) 70 interposing the buckle switch 68 and the motor-driven retractor (i.e., motor 34).

As will be seen from the description below, the system 10 will provide correct shoulder belt tensioning at any occupant position. In addition, the system includes the means necessary such that when the occupant changes body or seat position, belt slack is automatically corrected. The system will automatically provides a greater degree of comfort to the occupant in response to changes in D-ring position such that after the safety belt is tensioned by the motor it will reverse direction to controllably release the shoulder belt tension. Further, since the retractor 30 does not include a rewind spring there will be no residual belt load on the occupant. Similarly, because of the absence of the rewind spring when the occupant buckles the safety belt it will take considerably less effort as motor drag is considerably low. Further, in a crash mode it will be enabled by an impact sensor or accelerometer or by detecting the retractor inertial sensor or pendulum 40 motion, and the shoulder belt will be immediately tensioned and locked in place.

To accomplish the above, the invention utilizes the relation change of state of the D-ring 60 to maintain minimum belt slack and occupant comfort. In the preferred embodiment the relative change of state refers to changes in the relative position of the D-ring. D-ring velocity or combination of other state variables are within the scope of the present invention.

With reference to FIG. 3, there is shown a typical D-ring 60 of conventional design having an opening 72 for receipt of the safety belt 20. The D-ring is mounted to the pillar 14 (shown here in dotted line) by a pin 74 in a manner that it is free to rotate. Fabricated on the D-ring is a cam 76 which interacts with a linear potentiometer 80 attached to the pillar 14. As can be appreciated from FIG. 3, the rotation of the D-ring 60 i.e., cam 76, will cause a change in the resistance of the potentiometer 80. It should also be appreciated that the position of the D-ring can be sensed by means other than the linear potentiometer. Other equivalent devices would include a rotary potentiometer and optical encoders.

Using the D-ring position (angle) change allows one to utilize the relative motion or change in the D-ring position from a varying norm or base point to energize the motor 34 within the retractor 30 to retension the safety belt 20 when necessary.

The system 10 is configured to operate in a number of operational modes which control the tensioning, release or retensioning of the safety belt 20. In Mode 1 (M1) the safety belt 20 will be stowed in its retractor (30). This mode is operative when the seat belt is unbuckled such as when the occupant is exiting from the vehicle. Upon unbuckling of the seat belt such occurance being sensed by the state of the buckle switch 68, the ECU 70 will generate a signal to cause the motor 34 to rewind the safety belt 20. To insure that the safety belt 20 is rewound without tangling, the ECU 70 will cause the motor to rewind in a controlled fashion. In the preferred embodiment of the invention this control is accomplished by ramping the motor speed. This ramping function can be achieved by varying the applied voltage or duty cycle of the motor from zero percent to 100 percent over a time period of approximately two to three seconds. This slow start of the motor will prevent twisting of the belt during retraction. Mode 1 (M1) may also be initiated under another circumstance. There may be situations where a previously stowed seat belt, has been pulled out, such as when permitting passengers in a two-door vehicle to exit or if the safety belt 20 has been inadvertently extended for other reasons. Under these situations it is also desireable to restow the seat belt prior to its subsequent use by the occupant. As such, mode M1 will also be initiated when the safety belt 20 is not buckled and a door is opened or the ignition switch is turned on. Upon retraction of safety belt 20 the current within the motor will increase indicating such restowed condition. As such Mode 1 (M1) will be terminated when the motor tongue or current has reached a predetermined threshhold. In some situations during retraction of the seat belt the seat belt may become twisted and thereby create a temporary increase in tension of the safety belt which may cause the motor current to reach its threshhold prior to full retraction of the safety belt. It has been found that this condition of seat belt twisting may be solved by initially terminating the motor retraction when its current reaches the threshhold for a first time and then restarting the rewind cycle (Mode 1) by again ramping the motor speed for a second time. As such, after the motor current has reached its threshhold for the second time, the motor command signal is terminated. The ECU 70 includes a timer which may also be used to terminate Mode 1. As an example, if the motor current does not exceed its threshhold within a predetermined period such as 30 seconds, the ECU will automatically terminate Mode 1 and thereafter may generate a warning signal or activate a warning lamp to indicate that the safety belt has not been completely restored or alternatively a malfunction within the system.

Assuming for the moment that prior to start up of Mode 1 the D-ring 60 was in a forwardly rotating position as would normally occur with the safety belt 20 positioned about and comfortably tensioned, as explained below, about the occupant. It has been assumed for the purposes of discussion that a forward movement of the safety belt at the shoulder belt position which causes a forward rotation of the D-ring shall be referred to as a positive relative angle change and rearward motion of the shoulder belt 22 causes a rearward motion of the D-ring referred to as a negative relative angle change. In the normal driving condition the position of the D-ring would remain essentially constant, except for minor perturbations due to vehicle vibration. The position of the D-ring is stored, as described in greater detail below, by the ECU 70 as a norm or base position.

Upon release of the buckle and subsequent stowing of the seat belt in Mode 1, the D-ring 60 will achieve a substantially vertical position. The output of the D-ring angular sensor 80 is measured and this angle is stored in the ECU 70 to establish a new nominal D-ring angular position. If for some reason the safety belt 20 is pulled from its stowed position creating excess slack, the position of the D-ring will be disturbed from the previously stored normal angle. As an example, if the safety belt is pulled out, the D-ring will be moved forwardly relative to the pillar 14. This positive relative delta angle change will be sensed thereby activating the motor to cause it to once again restow the seat belt.

As can be seen the basic purpose of Mode 1 is to restow or attempt to restow the safety belt when the occupant exits the vehicle. As such, when the vehicle is not occupied unnecessary power should be turned off. This is accomplished as follows: upon unbuckling the safety belt it is retracted and the new D-ring position stored as described above. Upon reaching the current or torque limit for the second time an internal timer, within the ECU 70 is started. If no motion of the D-ring, from its then nominal position, has occurred within a fixed period of time, i.e., 1–10 minutes, the ECU 70 causes unnecessary power to be shut off. If during this period the D-ring has been disturbed, the timer is reset to zero and re-enabled. If no additional D-ring motion occurs the unnecesary power is disabled. As will be seen from the discussion below, the system includes a dual power supply, the low power standby portion of which is always enabled.

Mode 2 of the system 10 relates to the normal seat belt buckling operation. The purpose of this mode is to snug both positions of the safety belt 20, i.e., the shoulder portion and seat belt portion, about the occupant. Mode 2 (M2) is initiated by the signal generated by the buckle switch 68 indicating that the tongue 62 has been secured within the buckle 64. Recalling for the moment that the ECU 70 has stored the D-ring stowed position (Mode 1) as its nominal base angle, the subsequent buckling of the safety belt 20 about the occupant will cause the D-ring to move to a positive delta angle relative to its stowed position. As is typically the case upon the buckling up of the safety belt, excess slack may exist within both the seat belt and shoulder belt portions. As such the ECU 70 sense this positive delta angle and will command the motor to rewind the safety belt to eliminate such slack. Typically this will be accomplished by commanding the motor to operate in a full on position such that a sufficient belt tension will be generated to cause all portions of the continuous safety belt 20 to properly tension. The motor 34 will be stopped upon reaching a predetermined torque or current threshhold. Mode 2 will also be terminated if the motor threshhold has not been reached within a predetermined time (5–10 seconds) after the buckling of the seat belt. If Mode 2 is terminated by the timer, a warning light is activated. Additionally and prior to termination of Mode 2, the retractor motor 42 is reversed for a short period of time (perhaps 0.2 seconds) after retensioning to provide a predetermined amount of slack in the safety belt to provide a virtually tensionless condition on the occupant's shoulder to insure occupant comfort. Thereafter the D-ring will achieve a new forwardly displaced position from its stowed position. A time delay, typically 0.5–1.5 seconds, is built into the control logic to allow the D-ring to settle to a equalibrium angle after reversing. This angle will be stored as the new nominal D-ring angle. As mentioned, the motor 34 is activated upon changes of D-ring position from its then established norm or base angle. Due to road vibrations the D-ring position may move a modest amount from its then normal position. To prevent activating the motor 34 in response to such vibrations a dead-zone of perhaps ±0.5 degrees can be incorporated within the control system. As such the motor 34 would then only be activated upon D-ring movement in excess of the dead zone.

In Mode 3 (M3) the purpose of which is to resnug the buckled seat belt to control excess slack, such conditions may be achieved when: the occupant reaches forward of the nominal secured position as established in Mode 2 to adjust the radio or open the glove compartment, and returns, or when the occupant moves the seat forward or backward. Mode 3 may be thought of as an extended portion of Mode 2.

When forward D-ring positive delta angle movement occurs, greater than a set value such as 1.5 degrees, a timer in the ECU 70 is enabled. The timer period may be in the range of 5–8 seconds. Another timer is set for negative delta angle movements in excess of a set value such as 0.5 degrees. The timer period for negative motion is shorter and in the range of 0.5–1.0 seconds. The difference in treatment regarding positive and negative movement is as follows. When the occupant moves forward either in a transient mode or to a new permanent seat location, the safety belt remains in a state of positive tension about the occupant. In case of emergency the safety belt is properly positioned to protect the occupant. When the occupant moves rearwardly, i.e., moves the seat rearward or returns to the original seating position, the safety belt will become slack and should, within a short time period, be rewound to properly engage the occupant. In either case, after the above mentioned time periods have expired the ECU 70 commands the motor 34 to remove any excess slack in the manner as described in Mode 2, that is, the motor 34 will wind up the safety belt 20 until its current threshhold is released and then reverse wind to allow the necessary slack to insure occupant comfort in the new seating position. Obviously if the occupant has moved to a new permanent forward seating position, the amount of safety belt wind up is nominal. The D-ring position, as before, is permitted to stabilize, establishing a new norm or base D-ring position. It should be apparent the reverse winding of the motor 34 is only performed with the buckle switch 68 active.

The system includes a Mode 4 (M4), the purpose of which is to stow the safety belt after an incomplete buckle up operation. This mode is initiated by a change of the D-ring position of that stored in Mode 2 in response to the retraction of the safety belt from its stowed position and by monitoring the output of the buckle switch 68 such hat if the buckle switch signal is not operational within a specific time, the safety belt will be retracted to its stowed position such as achieved in Mode 1. Mode 4 is terminated in the same manner as Mode 1. Upon automatic retraction of the seat belt, the occupant is free to again try to buckle it.

A Mode 5 (M5) is also provided, the purpose of which is to remove all seat belt slack in the case of a high vehicle deceleration rate or impact. This mode is initiated by monitoring the output of the impact sensor 49. In addition, in this Mode 5 the retractor lock solenoid may be activated after all of the seat belt slack has been removed to physically lock the retractor and prevent the lengthening of the retracted safety belt during the impact.

FIG. 4 is a schematic block diagram illustrating the basic components of the electronic control unit 70. Block 100 is illustrative of the various sensors and switches which may be used in conjunction with the present invention. This would include the ignition switch, a left and right door sensors or switches, and left and right buckle switches 68. The output of these various switches and sensors are received by respective signal conditioning networks 102 as well as by at least one microprocessor 104 such as Intel 8798. The output of the signal conditioning networks are also fed to a switch detector network 106. The output of the switch detector network is supplied to a dual power supply 110 comprising a standby power supply 112 which is always active. This standby power supply is used to conserve battery power and may typically be characterized as having a current drain of no more than 50-100 microamperes. The dual power supply further includes a nominal or controlled power supply or portion 114 which will power the components of the ECU 70 with the exception of the signal conditioning network 102, and switch detector 106. Typically this controlled power supply 114 will have a current capacity of 300-400 milliamperes. The microprocessor 104 has stored therein the above described control logic for the system 10. The microprocessor generates motor control signals on lines 116 and 118 (shown diagramatically) which are communicated to respective motor drive conditioning electronics 120. The output of the motor drive conditioning electronics schematically on lines 122 and 124 are communicated to respective motor drive circuits 126a and b and to the respective reversible motors 34a and b. The motor torque of each respective motor is monitored by respective motor current sensing circuits 130a and 130b, the output of which is communicated to the microprocessor 104. The microprocessor also under certain circumstances may generate a warning signal communicated to a warning device 132.

The D-ring sensor such as linear potentiometer 80 is powered by a current limited source 140. The output of the D-ring position sensor 80 is communicated to the microprocessor 104 through a buffer circuit 142.

Figure 5D:
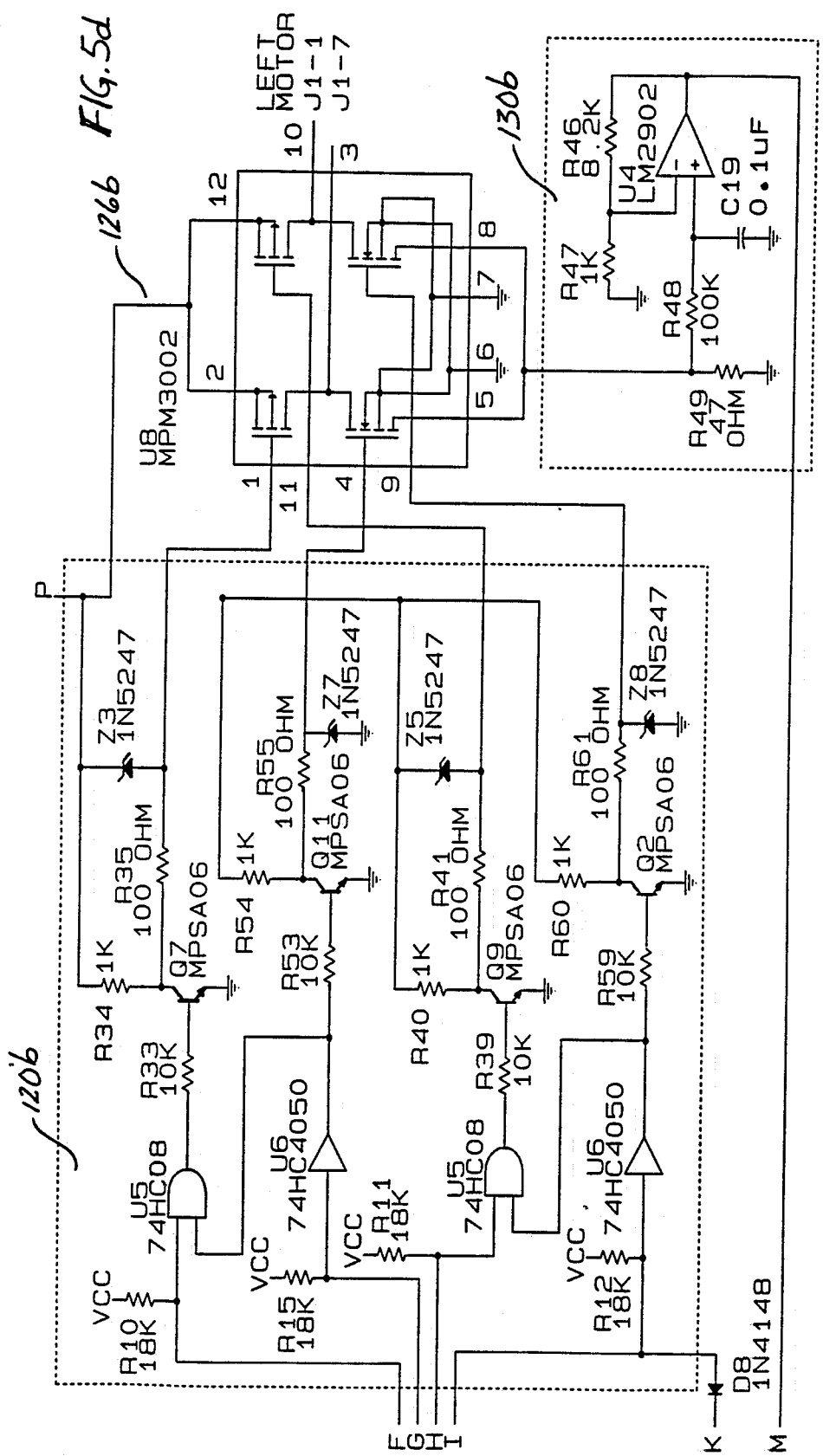

Reference is made to FIG. 5 which illustrates in greater detail the various circuits of the ECU 70. Shown within block 100 are the ignition switch, left and right door and left and right buckle sensors or switches. The signal conditioning circuit 102 comprises separate filters and buffer amplifiers for each switch or sensor shown in block 100. As an example, the ignition switch signal is received within filter network comprising capacitors C20 and 21, diode D2 and resistor R63. As can be seen in the structure of the filters, is substantially identical for each of the remaining sensor or switch signals. The output of the filter is received by a buffer amplifier which may be an inverting or non-inverting amplifier or amplifiers and depending upon the particular signal. With regard to the ignition switch signal, the output of its filtering network is received in buffer amplifier U6. The output of each buffer amplifier or buffer amplifiers is communicated to the to the switch detector circuit 106 and microprocessor 104. The switch detector 106 functions as an OR gate and is communicated to the power amplifier 110. The power supply 110 is a dual power supply which receives battery voltage through a filtering network; the output of the dual voltage supply 110 is a standby voltage (STB) and controlled voltage (VCC). As previously mentioned, the dual power supply 110 is used to minimize power consumption while the vehicle is not occupied.

As an example, if the ignition switch is off, both safety belts unbuckled, and the doors closed, the logic detector 106 will not generate a signal to activate the controlled voltage portion (VCC) of the power supply 110 and as such only standby power will be supplied to the signal conditioning network 102, and switch detector 106. Alternatively, when one of the switches or sensors 100 is activated, the detector circuit 106 will cause the power supply to activate its controlled voltage portion (VCC). Further it can be seen that the switch detector 106 is responsive to a signal generated by the microprocessor 104. This signal as shown emanating from pin 17 and is responsive to the condition of the D-ring. As mentioned relative to Mode 1 when the buckle switch 68 is not activated, and doors are closed the ECU 70 will cause the power supply to return to its standby condition when there has not been any D-ring movement for a fixed time period (typically 1-10 minutes). During this condition the respective output signals from block 100 are absent. As such, if there has not been any D-ring movement within such time period the ECU 70 will generate a zero voltage signal at pin 17 clamping the input to its respective OR gate U7 to zero, thereby insuring that the output of the switch detector circuit is low to initiate the standby power condition to conserve battery power. During other modes of operation, i.e., when one or more signals from the block 100 are received, the microprocessor will generate a 5 volt signal at pin 17.

The microprocessor 104 generates a variety of control signals to drive the retractor motors 34a and As shown, each of the respective motor drive circuits comprises H-bridges of known variety comprising MOSFET transistors. Each driver circuit comprises two transistors connected in series with the respective retractor motor connected to the respective junction of these transistors. The lower MOSFET transistors, of each series connection, are provided with a current monitoring terminal which will monitor the current flowing through the lower of the two transistors of each branch, such current corresponding to the current flowing through a particular retractor motor 34. This current monitoring terminal is connected to the motor current sensor circuit such as 130 which comprises a current to voltage converter. The output of each respective motor sensor circuit 130a or b (the output of amplifier U4, C or D) is communicated to the microprocessor 104.

The sensed motor current is filtered and amplified by various portions of the motor current sensor and communicated to the microprocessor which includes integral analog/digital (A/D) converters to convert the analog voltages (corresponding to motor current) to a digital word useable by the microprocessor where it is compared to a predetermined current limit value.

Interposing the microprocessor and each respective motor driver 126a and 126b are substantially identical motor drive signal conditioning circuits 120a and 120b. With regard to circuit 120a, this circuit (as well as circuit 120b) serves a number of functions. The right most portion of circuit 120a comprising of gates U5 ensure the proper sequencing of the drive transistors within the motor drive circuit since it is desireable not to energize both drive transistors in a particular series branch of the motor drive circuit 126 at same time. If this were to happen, a short circuit would occur across the motor drive circuit 126a. Unless compensated for, this situation might occur on power up of the microprocessor 104 since its output ports which drive the respective motor driver conditioning circuitry 120a may be ill-defined. The various Zener diodes Z2–Z8 protect the motor drivers 126 from voltage spikes and the respective transistors immediately upstream from the Zener diodes provide a degree of a level shifting.

The current limited source 140 is communicated to the D-ring position sensor 80 the output of which is buffered by circuit 142 and communicated to the microprocessor which converts the analog voltage corresponding to the D-ring position to a digital word.

As mentioned, the microprocessor is also capable of generating a warning signal such as in response to the above-mentioned timeout signal communicated to a warning device such as lamp 132. A further signal input to the microprocessor is supplied by the impact sensor 49. Further and in response to the impact sensor signal the microprocessor will enter Mode 5 and may energize the retractor lock solenoid 50 to physically prevent safety belt extension.

Many changes and modifications in the above described embodiment of the invention can, of course, be carried out without departing from the scope thereof. Accordingly, that scope is intended to be limited only by the scope of the appended claims.

We claim:
1. A safety restraint system for a vehicle comprising:
  a safety belt attachable at one portion thereof to a buckle means, the buckle means comprising a tongue portion attached to a safety belt and a buckle for receiving the tongue, first sensor means is provided for generating a first signal indicative of a buckled and an unbuckled state;
  D-ring means adapted to be rotatably mounted to a vehicle member, for slideably receiving a shoulder belt portion of the safety belt;
  second sensor means, coacting with the D-ring means for generating a second signal indicative of D-ring motion;
  retractor means adapted to be secured to a structure member of the vehicle, including a take-up spool, attached to an end of the shoulder belt and a reversible electric motor, in driving engagement with the take-up spool for rotating same in rewind and reverse directions in response to rewind and reverse control signals;
  third means for generating a third signal indicative of motor torque;
  control logic means for generating the rewind and reverse control in response to the states of the first and second sensor means including first storage means, responsive to the second signal, for storing a value indicative of D-ring position.

2. The system as defined in claim 1 wherein the control means includes mode select means responsive to the first, second and third signals for controlling various operational modes of the system.

3. The system as defined in claim 2 wherein the control means includes first mode means for defining a first operation mode in response to the unbuckled state of the first signal and for generating, a first mode rewind signal to cause the motor to rewind the safety belt about the take-up spool and for terminating such rewind when the third signal reaches a predetermined level indicative of a tightened belt condition.

4. The system as defined in claim 3 wherein the first mode means includes first drive control means for causing the motor rewind speed to increase with time from a previously nonrotating state.

5. The system as defined in claim 4 wherein motor speed is increased in a ramped manner.

6. The system as described in claim 4 wherein the first sensor means includes means for generating signals indicative of the state of an ignition switch, and the open and closed state of each vehicle door and wherein the first mode means causes the first mode rewind signal to occur in response to signals indicative of ignition switch turn on and door opening.

7. The system as defined in claim 3 wherein the first mode means includes means generating the first mode rewind signal for a second time, subsequent to the third signal reaching the predetermined level, for causing the motor to again attempt to rewind the safety belt.

8. The system as defined in claim 7 wherein the first storage means is activated to store a first value indicative of the position of the D-ring means subsequent to the second rewind of the motor.

9. The system as defined in claim 8 wherein the first mode means includes a first timer, having a predetermined first period, such that if the D-ring is moved from its first value during the first period, indicative of the condition that the safety belt has been pulled out, the first mode means again generates the first rewind signal to again retract the safety belt and restarts the first timer.

10. The system as defined in claim 8 including dual power means, for supplying power to the various sensor means and retractor means, comprising a controlled voltage portion and standby portion and wherein the control means includes select means, operational after the timing out of the first timer to deactivate the control voltage portion and in response to an ON state of an ignition switch and in response to a signal indicating that a vehicle door has been opened for activating the controlled voltage portion.

11. The system as defined in claim 3 wherein the control means includes second mode means, for defining a second mode of operation during times when the safety belt is about an occupant, in response to the first signal indicative of a buckled state and the second signal and perturbations in the D-ring first value, indicative of the position of the D-ring subsequent to rewinding of the safety belt including means for generating a second mode rewind signal to cause the motor to rewind at maximum speed and for generating a second mode reverse signal after the third signal reaches a predetermined level, to cause the motor to reverse for a short period of time to release shoulder belt tension on the occupant.

12. The system as defined in claim 11 wherein subsequent to motor reversal the control means monitors and stores the then current second position of the D-ring as indicated by the second sensor means.

13. The system as defined in claim 12 wherein the control means includes compare means for determining relative changes in D-ring position relative to the stored second position, such that for changes in D-ring position in a first direction, indicative of safety belt slack and for changes in D-ring position in a second direction, indicative of lengthening the safety belt and after a predetermined wait period, for generating the second mode rewind and reverse control signals.

14. The system as defined in claim 13 wherein the wait period for D-ring changes in the first direction is shorter than the wait period for D-ring changes in the second position.

15. The system as defined in claim 3 wherein the control means includes third mode means, for defining another mode of operation relating to an incomplete buckle-up operation, including means for sensing the unbuckled state of the first signal;
compare means for generating a rewind signal, within a predetermined third timer period, if the state of the first signal has not changed from unbuckled to buckled.

16. The system as defined in claim 3 including a crash sensor for generating a deceleration signal indicative of a high vehicle deceleration, the control means including fourth mode means, responsive to the deceleration signal for generating the rewind signal to immediately thereafter cause the motor to remove all slack in the safety belt.

17. The system as defined in claim 16 including a retractor lock means moveable into engagement with a portion of the retractor means, for physically locking the retractor means subsequent to motor rewind during high vehicle deceleration conditions.

18. A method for controlling the operation of a sear belt system, the system comprising a safety belt having one end adapted to be connected to a buckle a shoulder belt portion connected to a motorized retractor which includes a reversible motor, the shoulder belt portion slideably received through a D-ring having associated therewith a first sensor to generate a signal indicated of the motion of the D-ring, a second sensor is provided to generate a second signal indicative of the buckled state of the buckle and control logic means for controlling the modes of operation of the system in response to D-ring motion, the method comprising the steps of:
generation a first signal indicative of D-ring motion and storing such first signal;
generating a second signal indicative of a buckled or unbuckled state of the seat belt;
generating a motor rewind signal in a ramped manner to cause such unbuckled seat belt to retract;
terminating motor rewind upon generation of a third signal indicative of a predetermined level of motor torque.

19. The method as defined in claim 19 including the step of generating the rewind signal to attempt to rewind the motor for a second time and terminating the operation of the motor upon the generation of the third signal for the second time.

20. The method as defined in claim 20 including the step of monitoring the current D-ring motion; comparing the current D-ring motion to the stored first signal for a first period of time and generating the rewind signal if the D-ring motion has changed.

21. The method as defined in claim 20 wherein the system includes dual power supply including a higher current capacity controlled voltage portion and a lower current capacity standby portion and wherein the method includes the step of deactivating the controlled power portion after the expiration of the first period of time.

22. The method as defined in claim 21 including the step of reactivating the controlled power portion upon the generating of a signal indicative of a vehicle door opening.

23. The method as defined in claim 22 including the step of again storing the then current motion of the D-ring;
generating a buckle up signal indicative of the fact that an occupant has buckled the seat belt;
determining perturbation in D-ring motion indicative of seat belt slack;
generating a rewind signal to again rewind the seat belt;
terminating motor rewind upon generation of a third signal indicative of a predetermined level of motor torque and generating a reverse signal to cause the motor to reverse direction for a short period of time to pay-out a short length of belt thereby relieving shoulder belt tension on the occupant.

* * * * *